Dec. 6, 1955   A. F. SANDERS   2,725,863
DRIVE FOR THE FUEL PUMP TO A COMPRESSION IGNITION ENGINE
Filed Nov. 25, 1952
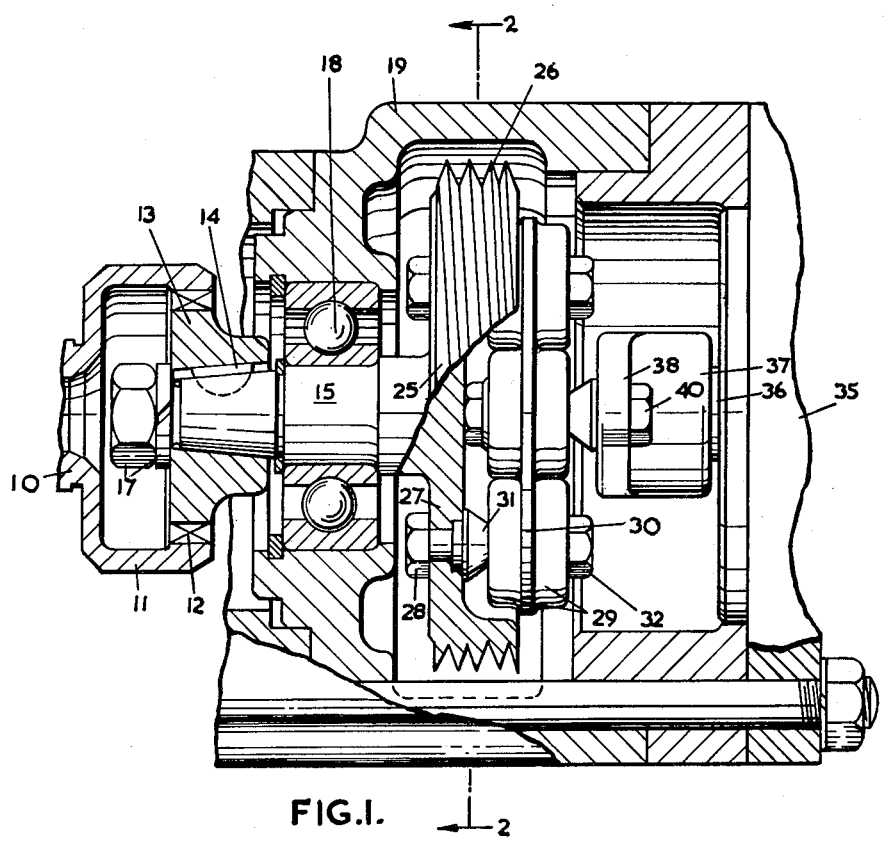
FIG.I.
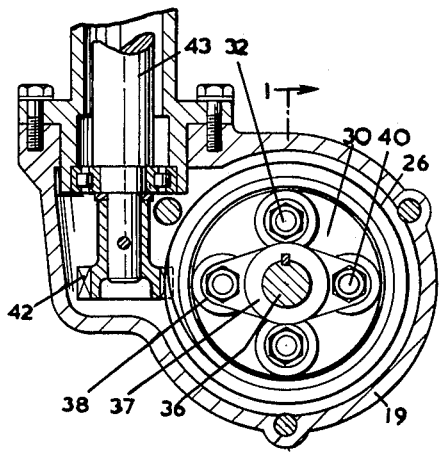
FIG.2.
INVENTOR
A. F. SANDERS
BY Mawhinney & Mawhinney
ATTYS.

United States Patent Office 2,725,863
Patented Dec. 6, 1955

2,725,863

DRIVE FOR THE FUEL PUMP TO A COMPRESSION IGNITION ENGINE

Arthur Freeman Sanders, Penzance, England

Application November 25, 1952, Serial No. 322,388

Claims priority, application Great Britain December 7, 1951

3 Claims. (Cl. 123—140)

The invention relates to a drive for the fuel pump of a compression ignition engine.

Hitherto such drives have been through a rigid coupling between the driving shaft of the engine and the fuel pump, in order to ensure exact timing and to maintain a constant rate of fuel injection. Such a rigid drive, however, when the engine is for propelling a vehcile, has been found to cause considerable noise to be transmitted between the fuel pump and the engine, and the main object of the invention is a drive with which such noise transmission will be materially reduced.

According to the invention, a compression ignition engine has a resilient coupling interposed in the drive to the fuel pump.

The resilient coupling can incorporate blocks of natural or synthetic rubber, a synthetic rubber of the kind known as neoprene being very satisfactory in the case where the fuel pump is enclosed in a casing causing the resilient coupling to be subjected to heat and oil vapour.

With an air cell type compression ignition engine the rate of fuel injection does not follow the normal constant injection volume per degree of engine crank rotation for which it is designed, and a drive according to the invention has the further advantage that the resilient coupling provides an effect rather like a spring injection (i. e., injection due to the effort of a spring) than what is commonly known as solid injection (i. e., when the injection is due to a rigid drive between the fuel pump and the engine). This spring type injection provided by the resilient coupling appears to be particularly beneficial in the case of air swirl engines, and practical tests indicate that much quieter running results, especially when the engine is idling.

One embodiment of the invention is illustrated in the accompanying drawings of which:

Figure 1 is a part-sectional elevation of the resilient coupling, taken on the line 1—1 of Figure 2, associated casing portions being shown in section; and Figure 2 is a section taken on the line 2—2 of Figure 1, to a smaller scale.

The rigid drive from the engine to the resilient coupling is shown at 10, and has adjacent the coupling a hollow cylindrical portion 11 provided internally with teeth 12 which mesh with teeth on a gear 13 keyed at 14 to one end of a shaft 15 of the resilient coupling. The gear 13 is shown as being secured to the shaft 15 by means of a nut and washer 17, and the shaft is journalled in a bearing 18 supported in a casing portion 19.

The shaft 15 at its other end is formed as a hollow gear 25, having an external worm thread 26 from which a drive to a governor mechanism (not shown) can be taken through a worm wheel 42 and shaft 43. The gear 25 has bolts 28 passing through a radial wall 27 on a diameter thereof. The bolts are respectively received in rubber bushes which are bonded both to internal bushes which receive the bolts, and to external casings 29 which are received in holes in and welded to a plate 30. The bolts are provided with conical centering sleeves 31 at one side of the coupling and with nuts 32 at the other.

The fuel pump, indicated diagrammatically at 35, has keyed to its driving shaft 36 a sleeve 37 having diametrically-extending lugs 38, carrying bolts 40 which are secured to rubber bushes, in a similar manner to that described, carried by the plate 30 at 90° from the driving bushes of the coupling.

It will be seen that the resilient coupling can be substituted for an existing rigid shaft drive from an engine to a fuel pump by inserting the casing portion 19 between existing casing portions 45, 46 and modifying the adjacent end of the drive shaft from the engine. Alternatively, the shaft 15 may be an intergral part of the drive shaft.

What I claim as my invention and desire to secure by Letters Patent of the United States is:

1. A compression ignition engine having a liquid fuel injection pump and a governor for said pump, an engine-driven shaft for driving the pump, a gear fast with said shaft for driving said governor, and a torsionally resilient coupling drivingly connecting said shaft to said pump and interposed in the shaft between said gear and said pump, whereby torque variations due to the operation of said pump are dampened in said coupling and not wholly applied to said engine and governor.

2. A compression ignition engine according to claim 1, in which said torsionally resilient coupling comprises a plate attached to said gear, said plate carrying spaced rubber blocks, said rubber blocks being in turn connected to a part of said shaft by which the pump is directly driven.

3. A compression ignition engine according to claim 1, including a bearing and a casing, the bearing being fixed in the casing and rotatably supporting said shaft, said gear lying wholly within said casing, and said casing being arranged to be inserted in an existing engine so as to provide said torsional resilient coupling between the pump and the engine.

References Cited in the file of this patent

UNITED STATES PATENTS

| | | |
|---|---|---|
| 1,361,711 | Gernandt | Dec. 7, 1920 |
| 1,609,448 | Wemp | Dec. 7, 1926 |
| 2,046,491 | Scott | July 7, 1936 |
| 2,148,821 | Kishline | Feb. 28, 1939 |
| 2,478,528 | Edwards | Aug. 9, 1949 |
| 2,625,114 | Coffey | Jan. 13, 1953 |

FOREIGN PATENTS

| | | |
|---|---|---|
| 824,259 | France | Feb. 4, 1938 |
| 233,437 | Switzerland | Oct. 16, 1944 |